United States Patent
Chauvin

(10) Patent No.: US 10,979,576 B1
(45) Date of Patent: Apr. 13, 2021

(54) TEXTURE ANALYSIS MECHANISM

(71) Applicant: James Chauvin, Boulder, CO (US)

(72) Inventor: James Chauvin, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/722,075

(22) Filed: Dec. 20, 2019

(51) Int. Cl.
| | |
|---|---|
| *G06K 15/02* | (2006.01) |
| *H04N 1/00* | (2006.01) |
| *G06T 7/00* | (2017.01) |
| *H04N 1/40* | (2006.01) |
| *G06T 7/174* | (2017.01) |
| *G06T 7/40* | (2017.01) |

(52) U.S. Cl.
CPC ....... *H04N 1/00034* (2013.01); *G06T 7/0004* (2013.01); *G06T 7/174* (2017.01); *G06T 7/40* (2013.01); *H04N 1/00005* (2013.01); *H04N 1/00074* (2013.01); *H04N 1/40012* (2013.01); *G06T 2207/20132* (2013.01); *G06T 2207/30144* (2013.01)

(58) Field of Classification Search
None
See application file for complete search history.

(56) References Cited

U.S. PATENT DOCUMENTS

| | | | |
|---|---|---|---|
| 6,736,478 B2 | 5/2004 | Franzke et al. | |
| 8,331,816 B2 | 12/2012 | Sheflin et al. | |
| 10,099,497 B2 | 10/2018 | Nagashima | |
| 2017/0043575 A1* | 2/2017 | Gracia Verdugo | ... B41J 2/16526 |
| 2019/0045068 A1 | 2/2019 | Tanaka et al. | |
| 2020/0134403 A1* | 4/2020 | Kato | ..... G06K 15/102 |

FOREIGN PATENT DOCUMENTS

JP    4168280 B2    8/2008

OTHER PUBLICATIONS

Burns, P. D. (Oct. 2014). Image quality concepts. Handbook of Digital Imaging, 1-47. doi: 10.1002/9781118798706.hdi004.
Nébouy, D. (Dec. 2015). Printing quality assessment by image processing and color prediction models. Image Processing, Université Jean Monnet—Saint-Etienne, 2015. Retrieved from https://tel.archives-ouvertes.fr/tel-01624275/document.
Wang, Z. et al. (Apr. 2004). Image quality assessment: from error visibility to structural similarity. IEEE Transactions on Image Processing, 13(4), pp. 600-612. Retrieved from https://www.cns.nyu.edu/pub/lcv/wang03-preprint.pdf.

* cited by examiner

*Primary Examiner* — Andrew H Lam
(74) *Attorney, Agent, or Firm* — Jaffery Watson Mendonsa & Hamilton LLP

(57) ABSTRACT

A system is disclosed. The system at least one physical memory device to store image texture analysis logic and one or more processors coupled with the at least one physical memory device, to execute the image texture analysis logic to receive first image data associated with a first nozzle group and second image data associated with a second nozzle group and analyze the first and second nozzle group image data to determine whether a difference between a texture of the first image data and a texture of the second image data exceeds a predetermined threshold, wherein the first nozzle group and second print head are neighboring nozzle groups.

20 Claims, 9 Drawing Sheets

TEXTURE ANALYSIS MECHANISM

FIELD OF THE INVENTION

The invention relates to the field of printing systems, and in particular, to detect printing defects.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a an array of printheads.

Each printhead in the assembly contains many nozzles for the ejection of ink or any colorant suitable for printing on a medium. However, each printhead in the assembly typically has slightly different characteristics due to manufacturing variances. Such characteristic differences between nozzle groups may affect the quantity of ink that is applied to a medium under certain conditions (e.g., as printhead temperature increases). These differences may result in a change of ink distribution between neighboring printheads, thus causing a visual non-uniformity between neighboring nozzle groups that appear as texture differences. These unintended texture differences reduce print quality, which is objectionable to many printing customers. A mechanism to quantify the applied texture differences is needed.

Accordingly, a mechanism to analyze and measure printed texture differences is desired.

SUMMARY

In one embodiment, a method is disclosed. The method comprises receiving first image data associated with a first nozzle group and second image data associated with a second nozzle group and analyzing the first and second image data to determine whether a difference between a texture of the first image data and a texture of the second image data exceeds a predetermined threshold, wherein the first nozzle group and second nozzle group are neighboring nozzle groups.

BRIEF DESCRIPTION OF THE DRAWINGS

A better understanding of the present invention can be obtained from the following detailed description in conjunction with the following drawings, in which.

DETAILED DESCRIPTION

A mechanism to perform analyze printed texture differences is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
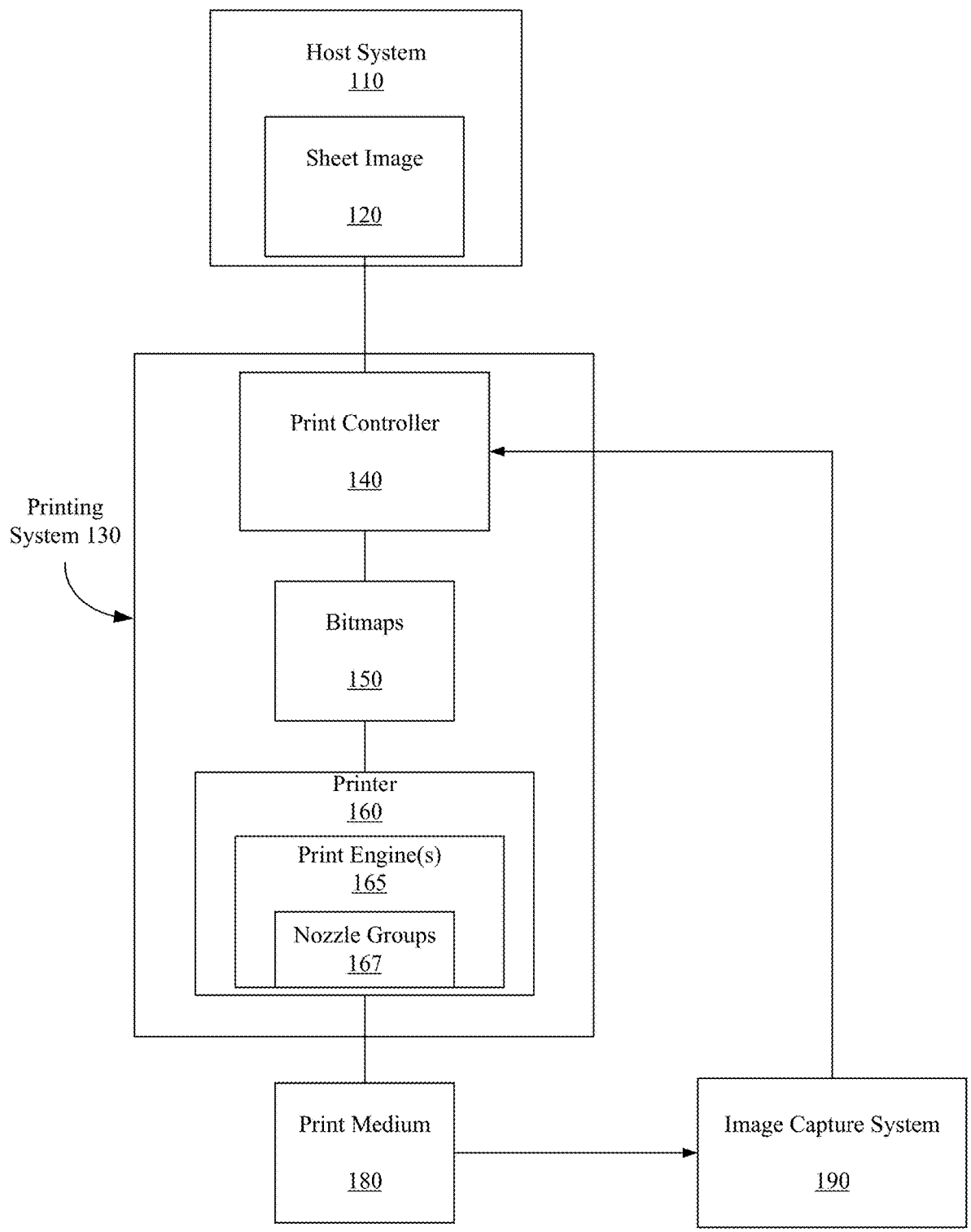
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, plastic, textile or other substrates suitable for printing) via a printer 160. The resulting print medium 180 may be printed in color and/or in any of a number of gray shades, including black and white (e.g., Cyan, Magenta, Yellow, and blacK (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines 165 to present the bitmap 150 onto the print medium 180 via marking material (e.g., toner, ink, coatings, etc.) based on the sheet image 120. According to one embodiment, each print engine 165 may include a plurality of nozzle groups 167. Examples of nozzles include inkjet nozzles and other print elements configured to emit marking material. In a further embodiment, a nozzle group 167 may comprise one or more printhead assemblies (or printheads). In other embodiments, nozzle groups 167 may comprise adjacent nozzles in a printhead, or nozzles for a common color plane in a multi-color plane printhead.

Print controller 140 and printer 160 may be both implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

In one embodiment, image capture system 190 is implemented as a camera implemented to capture one or more images of printed on print medium 180 that is communicated to print controller 140 to be used to perform texture analysis. The image capture system 190 may be a stand-alone process or be integrated into the printing system 130.

Figure 2:
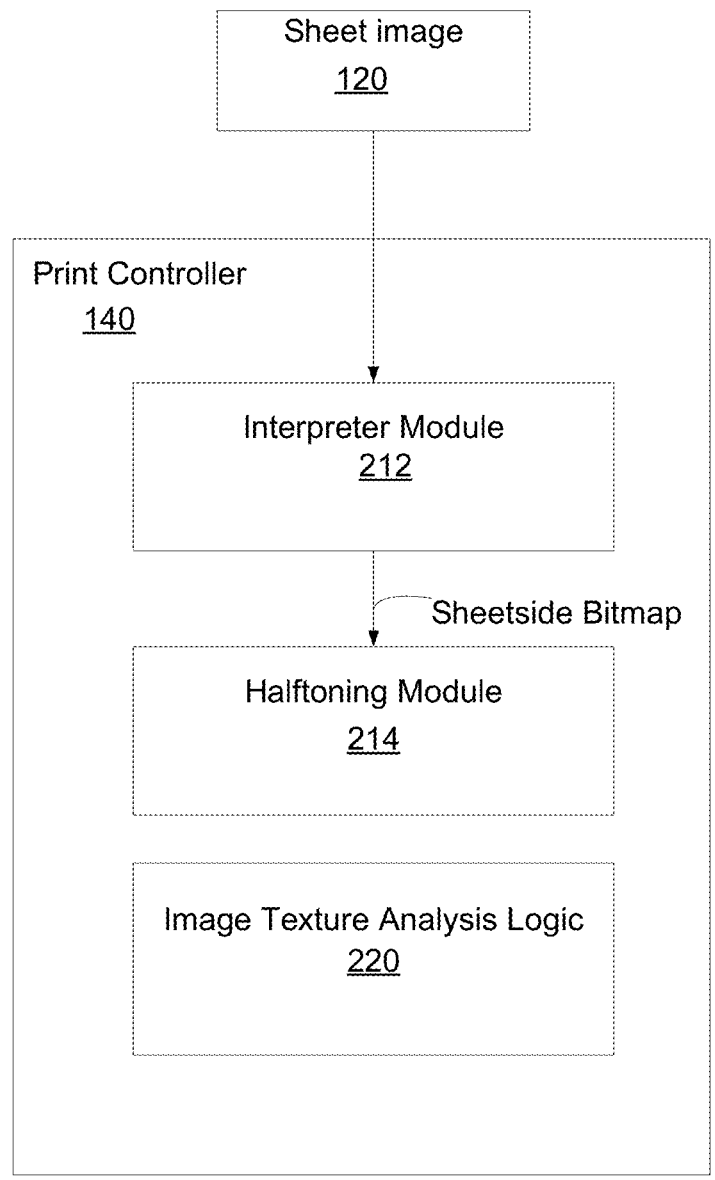
FIG. 2 is a block diagram illustrating one embodiment of a print controller.

FIG. 2 illustrate one embodiment of a print controller 140. As shown in FIG. 2, print controller 140 (e.g., DFE or digital front end), in its generalized form, includes interpreter module 212, halftoning module 214 and texture analysis logic 220. Interpreter module 212 is operable to interpret, render, rasterize, or otherwise convert images (e.g., raw sheetside images such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image.

Interpreter module 212 is operable to interpret or render multiple raw sheetsides concurrently so that the rate of rendering substantially matches the rate of imaging of production print engines. Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location.

Once halftoning is performed, the sheetside bitmaps may be applied to a medium (e.g., printed medium 180) by print engines 165. As discussed above, each nozzle group 167 within a print engine 165 may have different characteristics that affect print quality. For instance, the same data that is typically sent to each nozzle group 167 may appear different due to manufacturing tolerances in each nozzle group 167, or the temperature changes of the nozzle group 167. As a result, a different amount of ink may be undesirably jetted from each nozzle group 167, which changes print optical density of printed images on print medium 180 and results in visual texture differences between nozzle groups 167. Print engine 165 may adjust drive waveforms associated with the nozzle groups 167 to compensate for temperature changes but this may still create or increase visual texture differences between nozzle groups 167.

Figure 3:
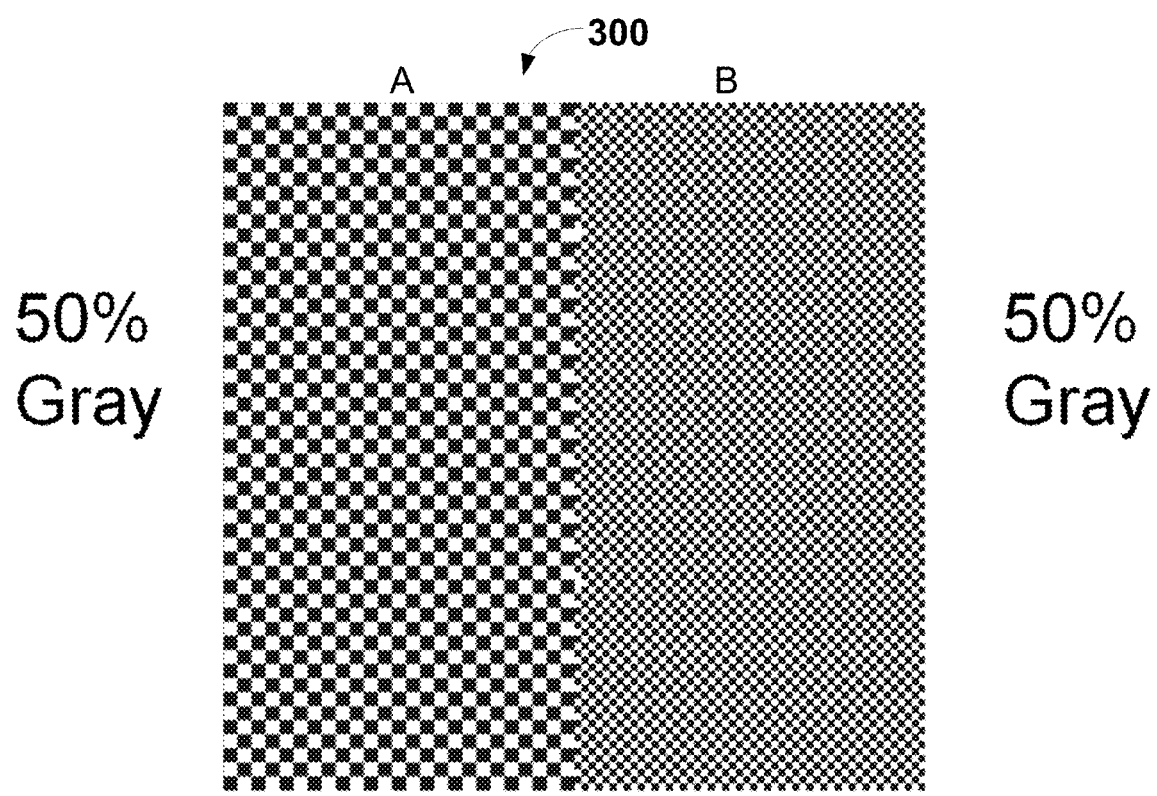
FIG. 3 illustrates one embodiment of marking material applied to a page.

FIG. 3 illustrates one embodiment of such texture differences of ink applied to a printed page 300 including sides A and B. As shown in FIG. 3, printed sides A and B both have a 50% gray ink distribution that was applied by neighboring nozzle groups 167 (e.g., printhead 1 and printhead 2). However, there is a substantial difference in the visual texture in sides A and B due to different ink distributions applied by the respective print engines. In FIG. 3, conventional image measurements (e.g., deltaE and deltaOD) performed on side A and side B would fail to show differences between side A and side B and so would also fail to indicate texture differences between side A and side B. In image analysis texture is related to performing image processing on an image to extract some features. Thus, a texture may be characterized as a region with intensity variations at a scale level. Textures may also be characterized by a common property of a set of pixels known under the denomination of "primitive" patterns.

Referring back to FIG. 2, image texture analysis logic 220 is implemented to analyze an image of texture applied to a print medium 180 by neighboring nozzle groups 167 and to generate a texture value (or metric) associated with each nozzle group 167. In such an embodiment, image texture analysis logic 220 compares the texture values for the neighboring nozzle groups 167 to generate a control value, which is a value representing the difference between the two texture values. The control value is subsequently compared to a threshold value to determine whether the texture difference between the neighboring nozzle groups 167 is within an acceptable range.

In a further embodiment, image texture analysis logic 220 may transmit an alert to indicate that the control value exceeds the threshold value, thus indicating that the threshold difference applied by the neighboring nozzle groups 167 is not within an acceptable print quality range. Although illustrated, and discussed herein, as being included within print controller 140, other embodiments may implement image texture analysis logic 220 external to print controller 140 (e.g., within image capture system 190, within a coupled separately implemented printer 160 or within a coupled cloud system).

Figure 4:
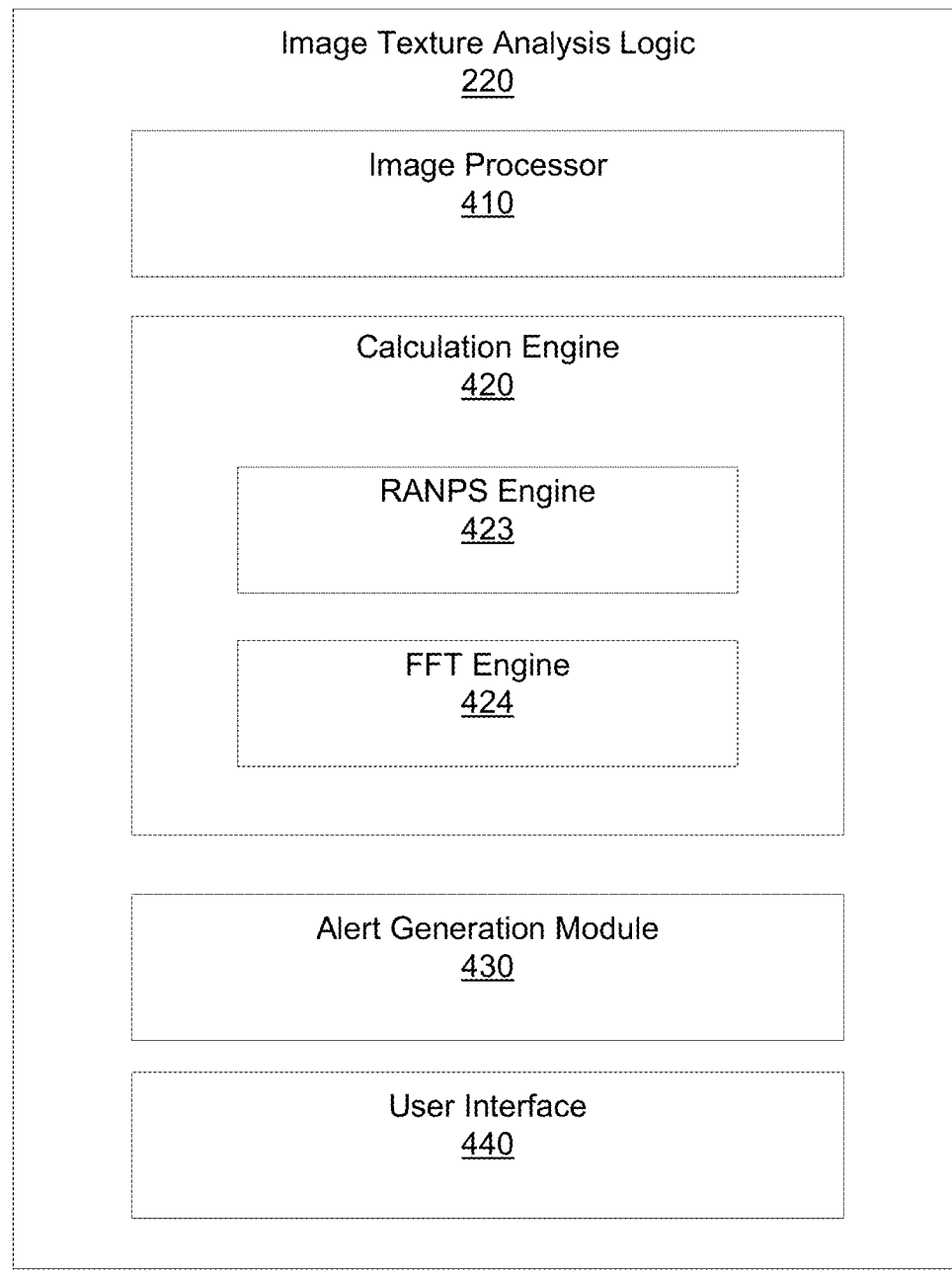
FIG. 4 illustrates one embodiment of an image texture analysis logic.

FIG. 4 illustrates one embodiment of image texture analysis logic 220. As shown in FIG. 4, image texture analysis logic 220 includes an image processor 410, a calculation engine 420, an alert generation module 430 and a user interface 440. According to one embodiment, image processor 410 receives printed images captured by image capture system 190 and processes the captured images to generate image data. In such an embodiment, an image comprises a high magnification (e.g., an amount of magnification suitable for identifying the texture features of interest) two-dimensional (2D) image of a print medium 180 at a print boundary of different nozzle groups 167. For example, the boundary of printing by different nozzle groups 167 may be adjoining regions of printing on print medium 180, with each region printed by different nozzle groups 167.

In a further embodiment, image processor 410 may convert the image to monochrome or single color (e.g., C, M, Y or K) plane prior to cropping the image to a first (e.g., left boundary) nozzle group image (or first nozzle group image data) and a second neighboring (e.g., right boundary) nozzle group image (or second nozzle group image data). In an alternative embodiment, image processor 410 may receive separate images (e.g., the first and second nozzle group image data) for each nozzle group 167. In this embodiment, no image cropping is necessary, and each image is processed separately if only one nozzle group 167 is represented within each of the separate images. In other embodiments, the functions performed by image processor 410 may be implemented at image capture system 190 prior to transmission to image texture analysis logic 220.

Calculation engine 420 analyzes the first and second nozzle group image data to generate a texture value associated with each of the neighboring nozzle groups 167. According to one embodiment, calculation engine 420 implements a radial average noise power spectrum (RANPS) engine 423 to compute the texture values. In this embodiment, RANPS engine 423 implements a 2D fast Fourier transform to convert the 2D image data (e.g., first nozzle group image data and second nozzle group image data) to a 2D Fourier (or frequency) domain, resulting in first printhead frequency data and second nozzle group frequency data. In one embodiment, the conversion is performed using a MATLAB fft2 function (e.g., Output1=abs(fftshift(fft2 (image))/(L*W)^2), where the output is the magnitude of the output from the function.

As mentioned above, application of the Fourier Transform decomposes the image into its sine and cosine components. Thus, the output of the transformation represents the image data in a frequency domain, while the input image is in the spatial domain. In the frequency domain image data, each point represents a particular frequency included in the spatial domain image. In one embodiment, the frequency domain analysis may be limited to a frequency range (e.g., low frequencies that human observers are most sensitive to) in order to focus on certain texture features.

According to one embodiment, the first nozzle group frequency data and second nozzle group frequency data may be scaled to negate a mean gray level of the original image by dividing the results of the fft2 function by the length*width of image squared, as shown above in the Output1 formula. In a further embodiment, the first nozzle group frequency data and second nozzle group frequency data is converted from cartesian coordinates to polar coordinates.

Figure 5:
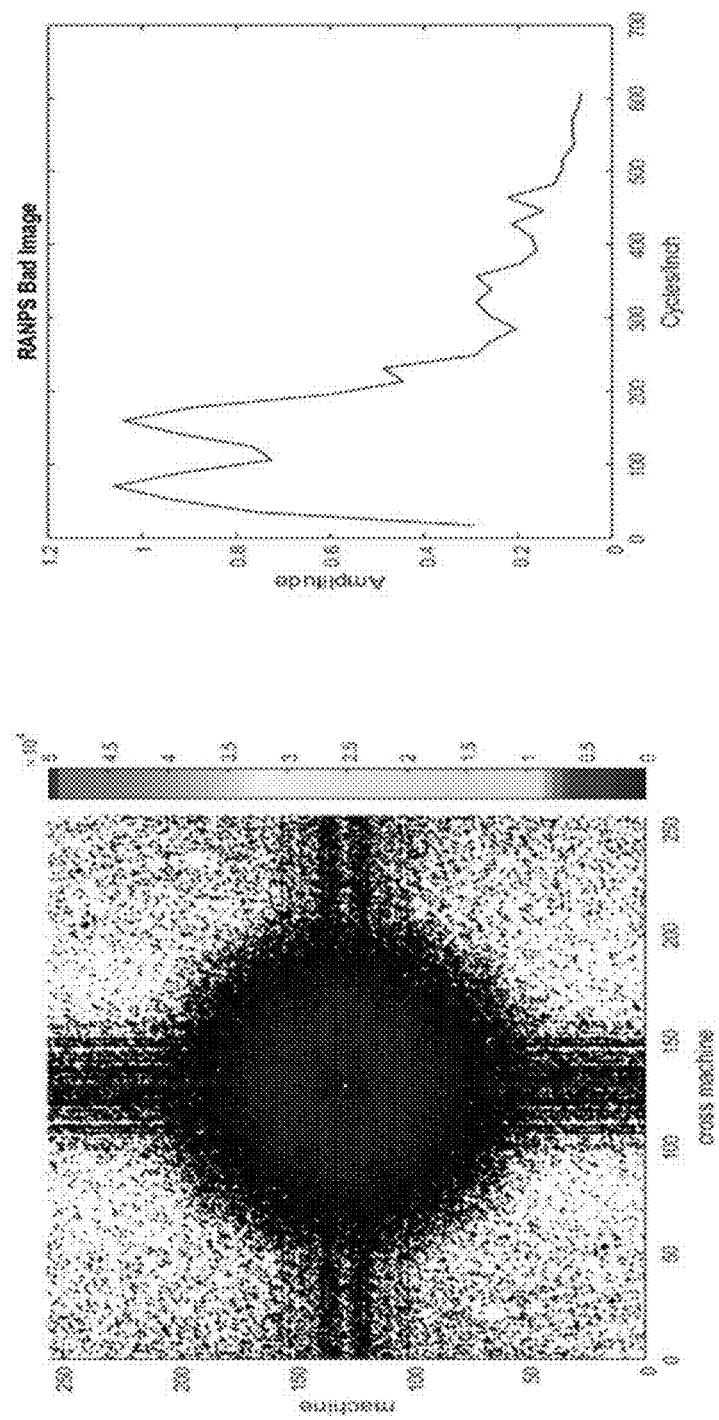
FIG. 5 illustrates one embodiment of averaging 2D output in the polar space.

Subsequently, the 2D output in polar space is averaged using different radius lengths from the origin to the edge of the image, which provides a single vector of values (e.g., first nozzle group vectors and second nozzle group vectors). FIG. 5 illustrates one embodiment of averaging 2D output in the polar space. In one embodiment, the first nozzle group vectors are added to produce a first texture value, while the second nozzle group vectors are added to produce a second texture value. The difference between the first texture value and the second texture value represents the control value.

Figure 6A:
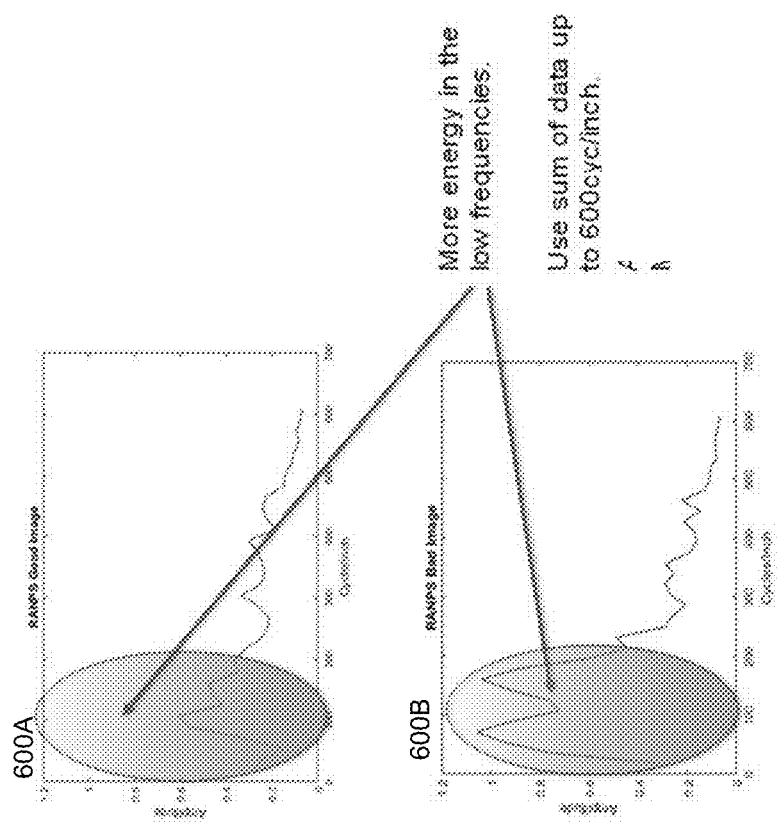
FIGS. 6A & 6B illustrate real data examples
Figure 6A:
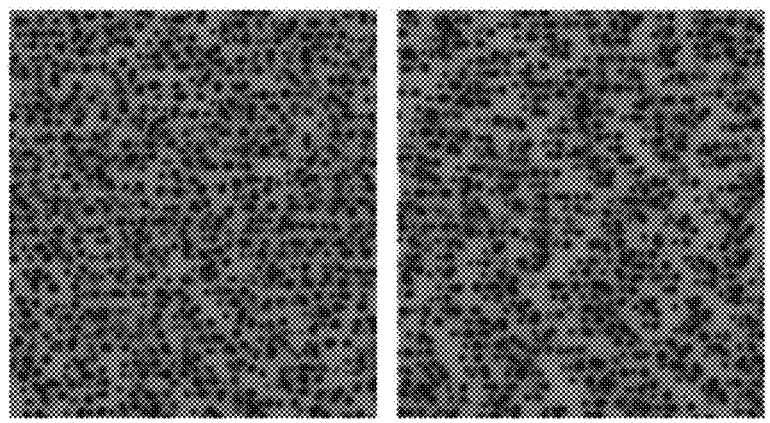

FIG. 6A illustrates a real data example implemented using RANPS engine 423. Graph 600A illustrates an acceptable (or good) image, while the graph 600B illustrates an unacceptable (or bad) image. The terms acceptable image and unacceptable image are used here only for convenience of reference in comparing the differences in graph 600A and graph 600B. The low frequency data for 600B shows higher amplitudes (and thus higher energy) than the low frequency data for 600A.

In an alternative embodiment, calculation engine 420 implements a vertical average FFT engine 424 to compute the texture values. In this embodiment, FFT engine 424 converts the first nozzle group image data and the second nozzle group image data to the first nozzle group frequency data and the second nozzle group frequency data, respectively, via a built in one dimensional (1D) FFT MATLAB function on each column of the image data (e.g., Output (column)=abs(fftshift(fft(image(all rows, one column))/(L) ^2). Similar to the discussion above, the first nozzle group frequency data and second nozzle group frequency data may be scaled to negate a mean gray level of the original image by dividing the results by the length of the columns of the image squared, as shown above in the Output(column) formula.

Figure 6B:
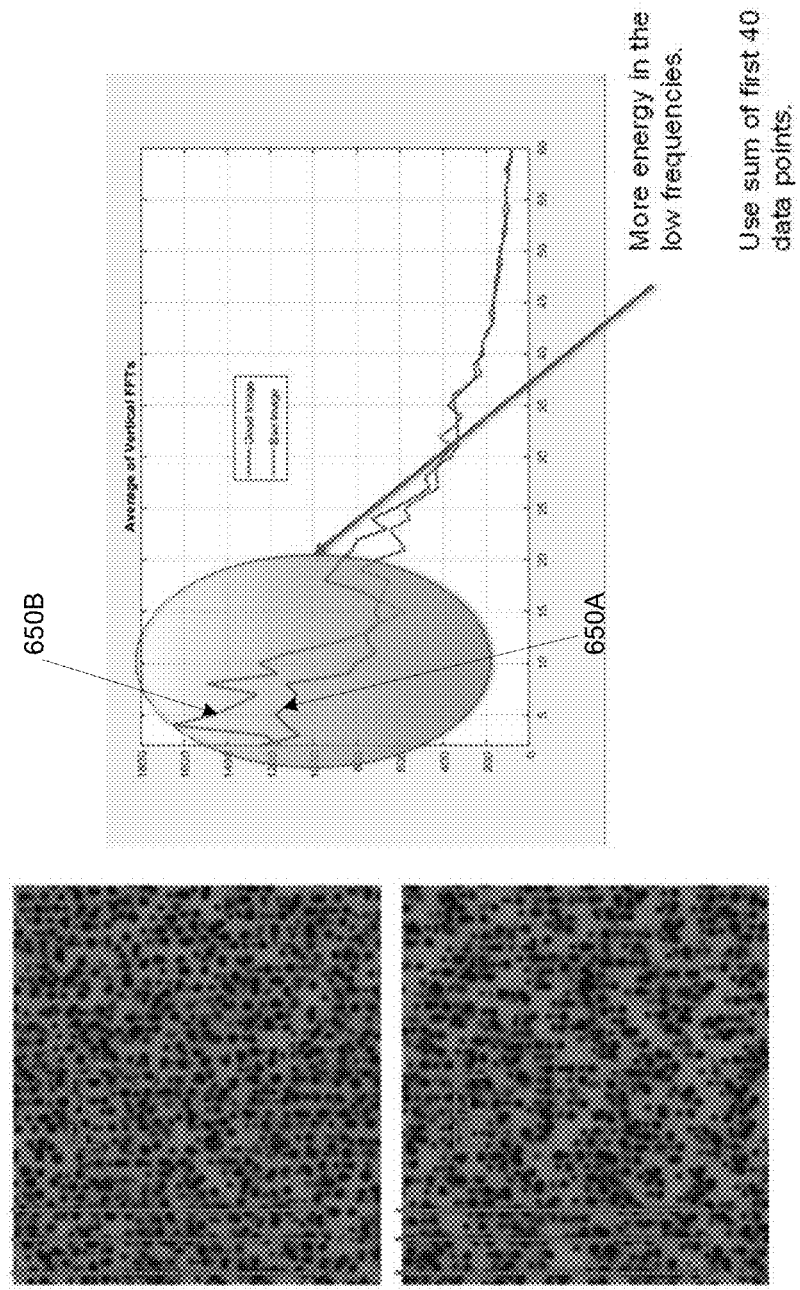

Subsequently, the FFT results from each column of the first nozzle group frequency data and the second nozzle group frequency data is averaged to obtain first nozzle group vectors and second nozzle group vectors. The first nozzle group vectors are added to produce the first texture value and the second printhead vectors are added to produce the second texture value. Again, the difference between the two texture values represents the control value. FIG. 6B illustrates a real data example implemented using vertical average FFT engine 424. Line 650A illustrates an acceptable (or good) image, while line 650B illustrates an unacceptable (or bad) image.

Alert generation module 430 receives the control value and compares the control value to a threshold value to determine whether the texture difference is within an acceptable range. In one embodiment, the threshold value is an adjustable value that may be provided to alert generation module 430 (e.g., received via a user interface 440 or from memory).

Alert generation module 430 transmits an alert to indicate that the control value exceeds the threshold value upon a determination that the control value exceeds the threshold value. In one embodiment, the alert is received at user interface 440 where it is received by an operator. In a further embodiment, the operator may implement various calibrations to one or both of the neighboring nozzle groups 167 to reduce the ink deposition disparities. In another embodiment, the alert is received by another coupled system (e.g., printing system 130, or printer 160) and the system may then respond with an action (e.g., stop printing or initiate calibration).

Figure 7:
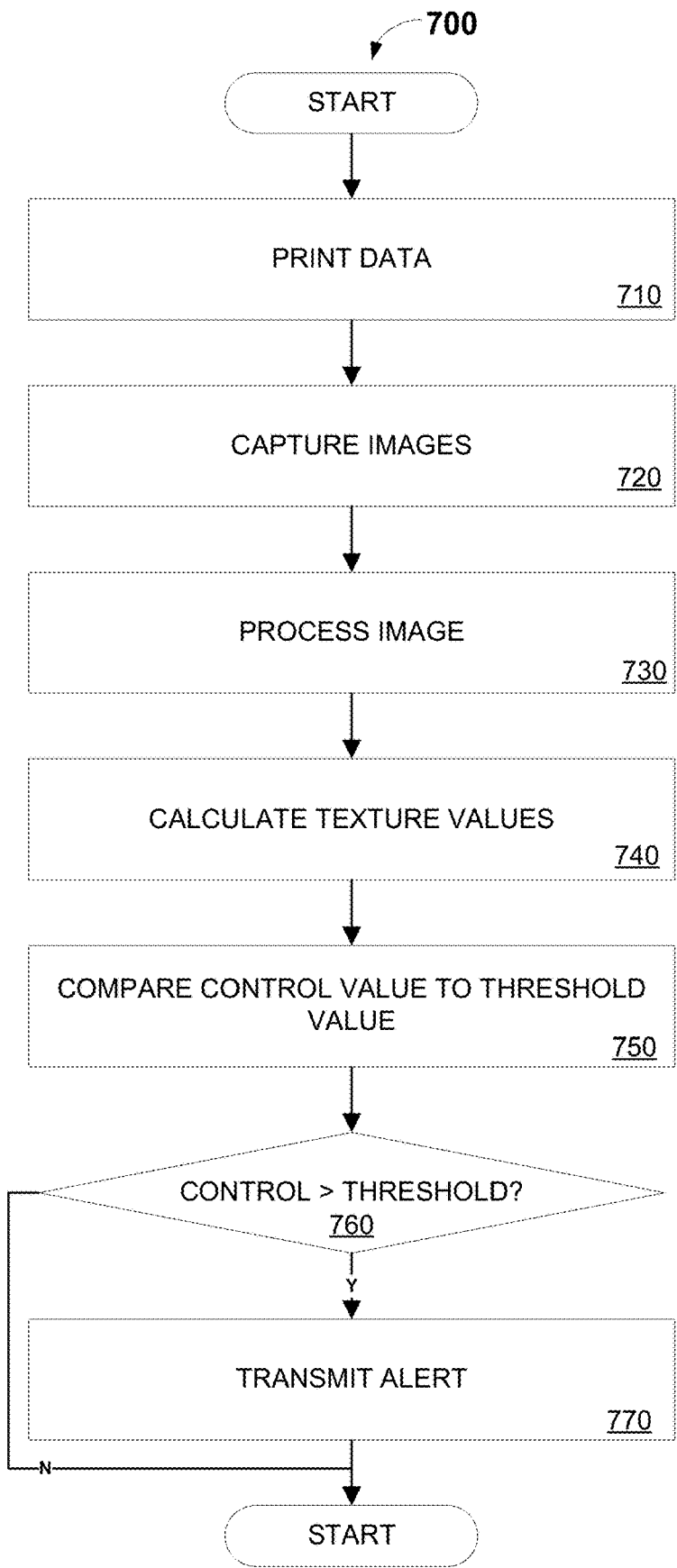
FIG. 7 is a flow diagram illustrating one embodiment for performing a texture analysis process.

FIG. 7 is a flow diagram illustrating one embodiment of a process 700 for performing image texture analysis. Process 700 may be performed by processing logic that may comprise hardware (e.g., circuitry, dedicated logic, programmable logic, etc.), software (such as instructions run on a processing device), or a combination thereof. In one embodiment, process 700 may be performed by image texture analysis logic 220. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 710 where print data is printed on a print medium 180 using neighboring nozzle groups 167. As discussed above, the same print data is transmitted to each nozzle group 167. Additionally, each nozzle group 167 includes an associated drive waveform that controls the ejection of the ink drop from a nozzle when fired. Thus, the waveform may determine drop sizes (small/medium/large) that are ejected to apply the print data to the print medium 180.

At processing block 720, one or more images of the printed print medium 180 is captured (e.g., via image capture system 190). At processing block 730, the images are processed. As discussed above, the images may be processed by converting the images to monochrome (or single color plane) and/or cropping into separate nozzle group boundaries.

At processing block 740, the texture values for each neighboring nozzle group 167 are calculated. As previously discussed, the texture values may be calculated via frequency domain analysis (e.g., an RANPS computation or a vertical average FFT computation). Subsequently, the neighboring nozzle group texture values are compared to determine a control value (e.g., the difference between the two texture values). At processing block 750, the control value is compared to a predetermined (e.g., received via user interface 440) threshold value. At decision block 760, a determination is made as to whether the control value is greater than the threshold value. If so an alert is generated and transmitted, processing block 770.

As discussed above, one or both neighboring nozzle groups 167 may be calibrated in response to the alert. Otherwise, the process is completed. In one embodiment, the nozzle groups 167 may be calibrated for improved uniformity across a group of nozzles to account for temperature changes or nozzle/manufacturing tolerances. In such an embodiment, the waveform at each nozzle group 167 may be adjusted based on a signal received from print controller 140.

Figure 8:
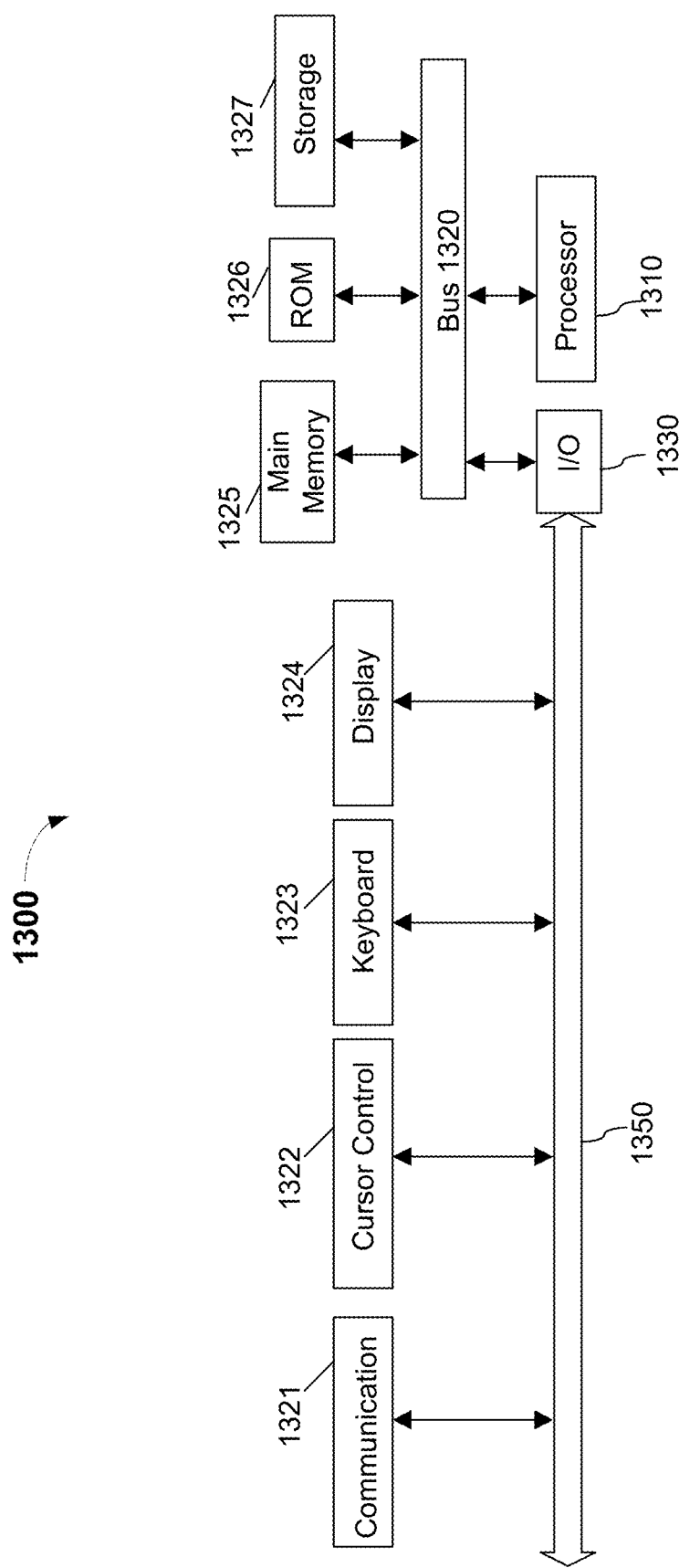
FIG. 8 illustrates one embodiment of a computer system.

FIG. 8 illustrates a computer system 1300 on which printing host 110, printing system 130, printer 160, image texture analysis logic and/or print controller 140 may be implemented. Computer system 1300 includes a system bus 1320 for communicating information, and a processor 1310 coupled to bus 1320 for processing information.

Computer system 1300 further comprises a random access memory (RAM) or other dynamic storage device 1325 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
   at least one physical memory device to store image texture analysis logic; and
   one or more processors coupled to the at least one physical memory device to execute the image texture analysis logic to receive first image data associated with a first nozzle group and second image data associated with a second nozzle group and analyze the first and second nozzle group image data to determine whether a difference between a texture of the first image data and a texture of the second image data exceeds a predetermined threshold, including generating a control value representing a difference between a first texture value and a second texture value, and determining whether the control value is greater than a threshold value associated with the predetermined threshold, wherein the first nozzle group and second nozzle group are neighboring nozzle groups.

2. The printing system of claim 1, wherein the image texture analysis logic analyzes the first image data and the second image data by generating the first texture value associated with the first nozzle group and the second texture value associated with the second nozzle group.

3. The printing system of claim 2, wherein the image texture analysis logic generates an alert upon a determination that the control value is greater than the threshold value.

4. The printing system of claim 2, wherein the image texture analysis logic generates the first texture value and the second texture value by applying a transform to convert the first nozzle group image data and the second nozzle group image data into first frequency domain image data and second frequency domain image data.

5. The printing system of claim 4, wherein the image texture analysis logic processes the first frequency domain image data and second frequency domain image data to generate first nozzle group vectors and second nozzle group vectors.

6. The printing system of claim 5, wherein the first nozzle group vectors are added to produce the first texture value and the second nozzle group vectors are added to produce the second texture value.

7. The printing system of claim 1, further comprising a print engine, including:
   the first nozzle group to apply print data to a medium; and
   the second nozzle group to apply the print data to the medium.

8. The printing system of claim 7, further comprising an image capture system to capture an image of the applied print data.

9. The printing system of claim 8, wherein the image texture analysis logic processes the image of the print data to generate the first and second image data.

10. The printing system of claim 9, wherein the image texture analysis logic further processes the image by converting the image to monochrome.

11. The printing system of claim 10, wherein the image texture analysis logic further processes the image by cropping the image to separate a first boundary image associated with the first nozzle group from a second boundary image associated with the second nozzle group.

12. At least one non-transitory computer readable medium having instructions stored thereon, which when executed by one or more processors, cause the processors to:
   receive first image data associated with a first nozzle group and second image data associated with a second nozzle group; and
   analyze the first and second image data to determine whether a difference between a texture of the first image data and a texture of the second image data exceeds a predetermined threshold, including generating a control value representing a difference between a first texture value and a second texture value, and determining whether the control value is greater than a threshold value associated with the predetermined threshold, wherein the first nozzle group and second nozzle group are neighboring nozzle groups.

13. The computer readable medium of claim 12, wherein analyzing the first nozzle group and the second image data comprises:
   generating the first texture value associated with the first nozzle group and the second texture value associated with the second nozzle group.

14. The computer readable medium of claim 13, having instructions stored thereon, which when executed by the one or more processors, further cause the processors to generate an alert upon a determination that the control value is greater than the threshold value.

15. The computer readable medium of claim 14, having instructions stored thereon, which when executed by the one or more processors, further causes the processors to generate the first texture value and the second texture value by applying a transform to convert the first nozzle group image data and the second nozzle group image data into first frequency domain image data and second frequency domain image data.

16. A method comprising:
   receiving first image data associated with a first nozzle group and second image data associated with a second nozzle group; and
   analyzing the first and second image data to determine whether a difference between a texture of the first image data and a texture of the second image data exceeds a predetermined threshold, including generating a control value representing a difference between a first texture value and a second texture value, and determining whether the control value is greater than a threshold value associated with the predetermined threshold, wherein the first nozzle group and second nozzle group are neighboring nozzle group.

17. The method of claim 16, wherein analyzing the first nozzle group and the second image data comprises:
   generating the first texture value associated with the first nozzle group and the second texture value associated with the second nozzle group.

18. The method of claim 17, further comprising generating an alert upon a determination that the control value is greater than the threshold value.

19. The method of claim 18, further comprising generating the first texture value and the second texture value by applying a transform to convert the first nozzle group image data and the second nozzle group image data into first frequency domain image data and second frequency domain image data.

20. The method of claim 19, further comprising:
   processing the first frequency domain image data and second frequency domain image data to generate first nozzle group vectors and second nozzle group vectors
   adding the first nozzle group vectors to produce the first texture value; and
   adding the second nozzle group vectors to produce the second texture value.

* * * * *